United States Patent
Anderl

[15] 3,692,393
[45] Sept. 19, 1972

[54] MOVIE CAMERA WITH DELAYED RELEASE AND SCENE LIMITING CIRCUITS

[72] Inventor: Peter Anderl, Munich, Germany

[73] Assignee: Niezoldi & Kramer GmbH, Munich-Allach, Germany

[22] Filed: Jan. 9, 1970

[21] Appl. No.: 1,740

[30] Foreign Application Priority Data

Jan. 9, 1969 Germany..........P 19 00 877.6

[52] U.S. Cl. ...................352/175, 307/293, 352/178
[51] Int. Cl. ..............................................G03b 15/00
[58] Field of Search ......352/175, 174, 178; 242/208; 307/253, 293; 328/78; 317/142 TD, 142 R

[56] References Cited

UNITED STATES PATENTS

| 3,027,800 | 4/1962 | Leuschke | 352/175 |
| 3,238,008 | 3/1966 | Krumbein | 352/175 X |
| 3,287,608 | 11/1966 | Pokrant | 307/293 X |
| 3,506,881 | 4/1970 | Leary | 307/293 X |

*Primary Examiner*—Louis R. Prince
*Assistant Examiner*—Denis E. Corr
*Attorney*—Ernest F. Marmorek

[57] ABSTRACT

In a movie camera, an energizing circuit including a supply source for the camera, a drive motor included into such circuit, releasing device having a rest position in which it is operable to open the energizing circuit and an operating position in which it is operable to close the energizing circuit, the releasing device including a manually operable releasing member having an open and a closed position and included in the energizing circuit, a control magnet in circuit relationship with the motor, with the supply source and with the releasing member, a timing network connectable across the releasing member for affecting the energization of the control magnet after a predetermined time interval while the releasing member is in the open position.

10 Claims, 4 Drawing Figures

MOVIE CAMERA WITH DELAYED RELEASE AND SCENE LIMITING CIRCUITS

FIELD OF THE INVENTION

The present invention relates generally to a movie camera and, more particularly, it relates to a movie camera having delayed release and limiting features.

BACKGROUND OF THE INVENTION

The present invention relates to a movie camera having a releasing device therein switchable to various positions to accommodate the operation of the camera at different modes of operation and which includes an electro-magnetically controlled releasing member which in its rest position locks the camera drive by opening the motor circuit and in which upon the manual operation of such releasing member or of a releasing key, the releasing device is transferred into an operating position in which the camera drive is released from its locked position by the closing of the motor circuit by means of a control magnet.

Movie cameras of such type do not provide the possibility to take the picture, that is, to make a movie of the person who is handling the camera unlike the still picture cameras which are now constructed to make self-timed pictures of the person operating the camera.

SUMMARY OF THE INVENTION

It is, therefore, an object of the present invention to provide a movie camera which is capable of taking self-timed type moving picture of the person operating the camera.

According to the invention, the above object is met by providing a timing or delayed release device with it or attachable to the movie camera and which is connectable across the manual release mechanism and in circuit relationship with a control magnet energizing the release apparatus of the camera.

The provision of such timing or delayed release device offers an opportunity to the person making the movie to have sufficient time to join the scene being filmed, that is, either to have his own picture taken or to participate in a group picture. With the provision of the delayed release device, the person making the picture still has to leave the scene in order to stop the camera. This is not disturbing in a case when the departure of the person operating the camera from the scene and the remaining of the others within the scene represents a scene as desired.

However, in most cases, the departure of the person operating the camera from the scene is disturbing and it becomes necessary to cut the scene portion in order to provide for a smooth continuity between subsequent scenes.

In order to eliminate the last-mentioned difficulties, in accordance with another aspect of the invention, there is provided in addition to the delayed release device also a time circuit which functions as a scene limiting device and which determines the period during which a scene is filmed.

BRIEF DESCRIPTION OF THE DRAWINGS

The invention will become more readily apparent from the following description of preferred embodiments thereof shown in the accompanying drawings, in which.

DESCRIPTION OF THE PREFERRED EMBODIMENTS

Figure 1:
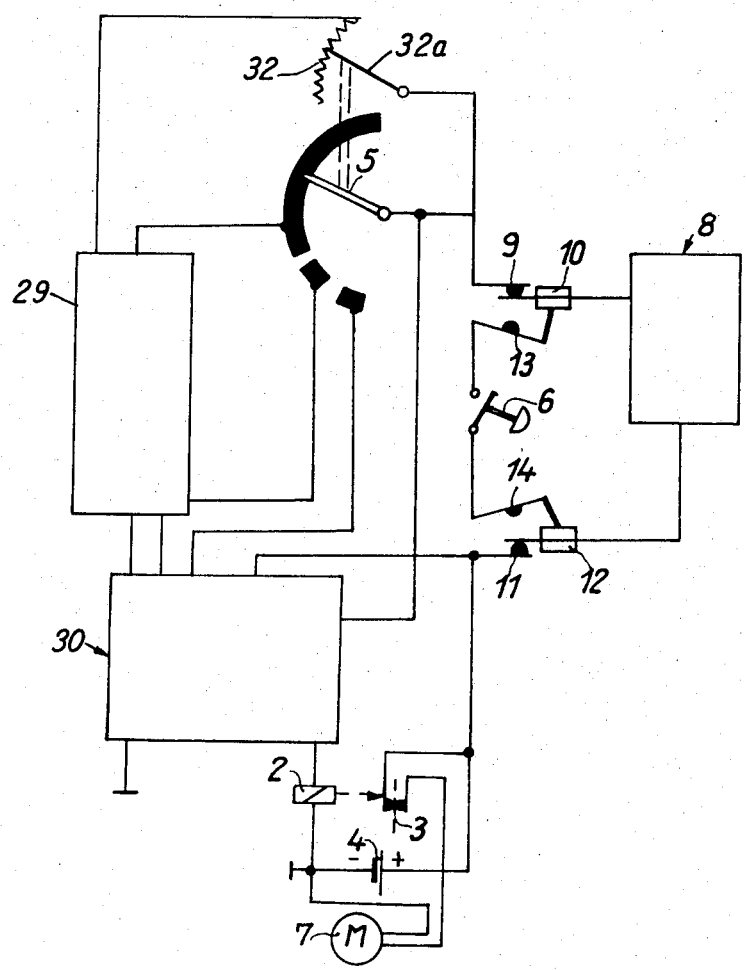
FIG. 1 is a schematic illustration partly with block diagrams of the releasing apparatus of a movie camera having an electro-magnetic control device therein.

With reference to FIG. 1 it is seen that the electro-magnetically controlled releasing apparatus of a movie camera substantially comprises an electronically or magnetically constructed regulator including a timer in the form of a pulse generator 29 and a pulse shaper 30 as described in more detail in application Ser. No. 790,663, now U.S. Pat. No. 3,603,678 and a control magnet 2 having an armature which opens or closes a magnetic switch 3 associated therewith as described hereinafter.

The exciting circuit of control magnet 2 includes a power source 4, a selector switch 5 associated with a slider 32a of a variable resistor 32 for selecting a desired mode of operation as well as a releasing or triggering device 6. Control magnet 2 closes an associated magnetic switch 3 in accordance with the time intervals selected by means of switch 5 and resistor 32 and by means of operating the releasing device 6 and thereby throws into a circuit connected parallel with the control magnet 2 a drive motor 7 which in turn sets the camera drive into motion. As it has been disclosed in the aforementioned U. S. Pat. No. 3,603,678 the pulse generator 29 controlled by the switch 5 and variable resistor 32 is employed merely for the generation of trigger pulses for the release controlling magnets 2. The adjustable time intervals between respective trigger pulses determine the desired mode of operation such as the so-called time lapse effect. It is apparent, however, that many modifications can be made in the devices for the production of such adjustable trigger pulses.

By inserting into the circuit a timing or delayed release device as well as a scene limiting device shown in block diagram form as box 8 in FIG. 1 and described in more detail hereinafter with reference to FIGS. 2–4, the manual releasing device 6 becomes isolated from the above-mentioned exciting circuit and its function is taken over by the delayed release or scene limiting devices 8. The delayed release or scene limiting devices 8 are connected in circuit relationship with the releasing apparatus and exciting current circuits of the camera by means of a plug connection represented by contacts 9, 10 and 11, 12 including normally closed or spacing contacts 13 and 14.

It is also possible by providing a simple plug connection or switch instead of the plug connection with an included spacing contact, that the delayed release or scene limiting device 8 is inserted into the exciting circuit of the camera without the isolation of the releasing key 6. In this case the operation of the releasing key 6 will short-circuit of the delayed release or scene limiting circuits.

Figure 2:
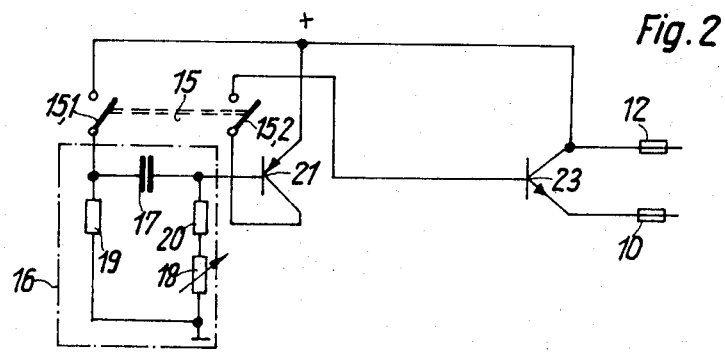
FIG. 2 is a circuit diagram illustrating the timing or delayed release circuit.

FIG. 2 shows a circuit diagram of the box 8 of FIG. 1 which in the embodiment shown in FIG. 2 includes only a timing or delayed release circuit. A start switch 15 through its contact 15.1 connects a timing or differential circuit portion 16 to the positive pole of the current source over plug connection 12. The timing or differential circuit 16 includes a capacitor 17 a variable resistor 18 and a pair of fixed resistors 19 and 20 connected to the base electrode of a switching transistor 21. The collector of switching transistor 21 is returned over starting switch 15, more particularly through contact 15.2 to the base electrode of a second switching transistor 23, the collector and emitter electrodes of which are connected to terminals 12 and 10 of the plug connector discussed in connection with FIG. 1.

Upon closing of the starting switch 15, at the instant of the closing the full positive potential appears at the base electrode of the pnp- transistor 21 as coupled to it by the charge-free capacitor 17. At the same time the base-emitter voltage of this transistor is equal to zero which means that the transistor is closed, that is, it is in a non-conducting state.

The base voltage of the transistor 21 drops during the charging period of capacitor 17 to a point until the base-emitter voltage of the transistor 21 reaches the switching threshold or level thereof, whereupon transistor 21 starts conducting.

When switching transistor 21 conducts, the current flows through its collector-emitter path whereby its collector electrode assumes a positive potential very nearly the same as that of the emitter electrode. As a result of this, the base-emitter voltage of the second complementary switching transistor 23 which at the non-conducting or closed state of switching transistor 21 is near to zero, will exceed its threshold level. Therefore, switching transistor 23 starts conducting and closes the exciting current circuit of control magnet 2.

The term delayed release represents a time interval which is necessary for the base-emitter voltage of the switching transistor 21 to reach its threshold level. Such time interval depends from the time constant of the differential or timing circuit 16 and it can be varied by means of the variable resistor 18.

Figure 3:
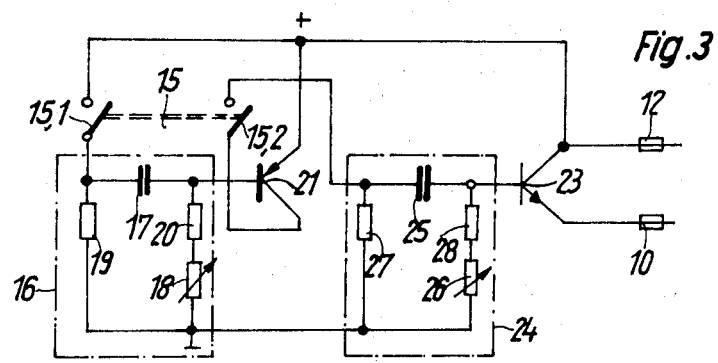
FIG. 3 is a circuit diagram similar to the one shown in FIG. 2 including also a scene limiting circuit.

FIG. 3 in addition to FIG. 2 includes a so-called scene limiting feature in the form of a differential circuit 24 connected between the collector electrode of switching transistor 21 through contact 15.2 of the start switch 15 and between the base electrode of switching transistor 23. This differential circuit 24 or time circuit, comprises a capacitor 25, a variable resistor 26 and a pair of fixed resistors 27 and 28.

At the instant of the switching of transistor 21 into its open state, the base-emitter voltage of the second switching transistor 23 reaches through the charge-free capacitor 25 its highest possible value and exceeds the switching threshold level of transistor 23 and makes it conducting. But during the charging of capacitor 25, the base-emitter voltage drops only to an extent that it will again fall below the threshold level of transistor 23. As a result, transistor 23 will close and interrupts thereby the exciting circuit of control magnet 2 while switching transistor 21 is conducting.

The scene limiting period represents the time during which the base-emitter voltage of switching transistor 23 reaches or crosses below its switching threshold level after the switching transistor 21 has opened. Such time period depends from the time constant of the timing circuit 24 and it can be adjusted by means of the variable resistor 26.

Figure 4:
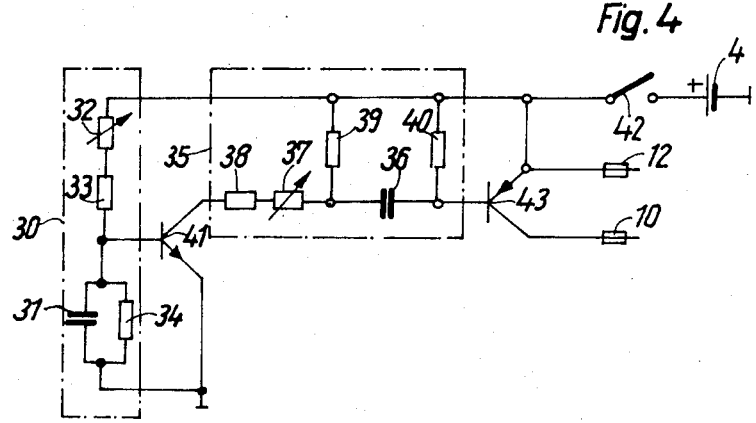
FIG. 4 is a further embodiment of the circuit shown in FIG. 3.

FIG. 4 differs from FIG. 3 in the outlay of its both differential or timing circuits 30 and 35 as well as in the different doping of the corresponding switching transistors.

Differential circuit 30 comprises a capacitor 31, a variable resistor 32 and a pair of fixed resistors 33 and 34 and substantially corresponds thereby to the differential circuits 16 in FIGS. 2 and 3. Differential member 35 comprising capacitor 36, a variable resistor 37 and a pair of fixed resistors 38, 39 and 40 is intended to fulfill the function of the differential circuit 24 of FIG. 3.

At the same time resistors 32, 33 and 34 of differential circuit 30 serve as base voltage dividers and the resistors 38, 37 and 39 of the differential circuit 35 serve to fix the operating point of the first switching transistor 41.

The embodiment shown in FIG. 4 is preferably intended for fixed connection into the movie camera and wherein the positive terminal of source 4 is connected by main switch 42 of the camera directly with the delayed release or scene limiting circuit portions and thereby the start switch 15 shown in FIGS. 2 and 3 becomes obviated. Also, here the exciting circuit of the control magnet 2 is affected by switching transistor 43 which is complementary to switching transistor 41.

The embodiments shown in FIGS. 2 and 3 are preferably made as self-contained units which can be pluged into the camera and which are only optional parts of a movie camera and may be constructed having their own separate supply source or use the supply source of the camera as described in connection with FIGS. 2 and 3.

From the above, it is apparent that although the invention has been described hereinbefore with respect to certain specific embodiments thereof, it is evident that many modifications and changes may be made without departing from the spirit of the invention. Accordingly, by the appended claims, we intend to cover all such modifications and changes as fall within the true spirit and scope of this invention.

I claim:

In a motion picture camera, an energizing circuit adaptable to be connected to a supply source for energizing said camera, a drive motor included into said circuit, releasing means switchable to a number of operating positions for defining various modes of operation of said camera, said releasing means including an electromagnetically operable releasing branch circuit common for all said operating positions and having an open and a closed position in which it opens and closes said energizing circuit, a control magnet to control said energizing circuit in its relationship with said motor, with said supply source and with said releasing member, a manual trigger included in said releasing branch circuit and having an open and a closed position for affecting the energization of said control magnet when actuated, a timing network connected across said trigger for affecting the energization of said control magnet after a predetermined time interval while said trigger is in said open position.

2. The combination as claimed in claim 1, wherein said timing network comprises first and second transistor means, each including a base, an emitter and a collector electrode and connected for alternate conduction, a delay circuit including a differential portion connected to the base electrode of said first transistor means for firing said first transistor means after a predetermined time period, said second transistor means being fired after said first transistor means is fully conductive, said control magnet being connected into the collector-emitter circuit of said second transistor means.

3. The combination as claimed in claim 2, wherein said differential portion comprises capacitor means and a variable resistor means connected to said capacitor means for varying the charge time of said capacitor means.

4. The combination as claimed in claim 3, further including manually operable start switch means for connecting said timing network to said power supply source and marking the beginning of said time interval.

5. In a motion picture camera, an energizing circuit including a supply source for said camera, a drive motor included into said circuit, releasing means including a manually operable trigger and a releasing circuit having an open and a closed position and included in said energizing circuit, a control magnet to control said energizing circuit in its relationship with said motor, with said supply source and with said releasing circuit, a timing network connectable across said releasing member for affecting the energization of said control magnet after a predetermined time interval while said trigger is in said open position, said timing network comprising first and second transistor means, each including a base, an emitter and a collector electrode and connected for alternate conduction, a delay circuit including a differential portion connected to the base electrode of said first transistor means for firing said first transistor means after a predetermined time period, said second transistor means being fired after said first transistor means is fully conductive, said control magnet being connected into the collector-emitter circuit of said second transistor means, said timing network including a limiting portion for limiting energization of said control magnet to a predetermined scene interval, said limiting portion comprising differential network including capacitor means and a variable resistor means connected to said capacitor means to vary the charging time thereof, said limiting portion being connected between the collector circuit of said first transistor means and the base electrode of said second transistor means.

6. A timing network connectable across a manually operable releasing member of a motion picture camera for affecting energization of the driving motor and the releasing apparatus of said camera after a predetermined interval and for limiting energization of said motor to another predetermined interval while said releasing member is in an off position, comprising first and second transistor means, each including a base, an emitter and a collector electrode and connected for alternate conduction, a delay circuit including a differential portion connected to the base electrode of said first transistor means for firing said first transistor means after a predetermined time period, said second transistor means being fired after said first transistor means is fully conductive.

7. A timing network as claimed in claim 6, wherein said differential portion comprises capacitor means and a variable resistor means connected to said capacitor means for varying the charge time of said capacitor means.

8. A timing network as claimed in claim 7, further including manually operable start switch means for connecting said timing network to a power supply source and marking the beginning of said time interval.

9. The timing network as claimed in claim 6, comprising a plug-type terminal portion for connecting said timing network to said camera.

10. A timing network connectable across a manually operable trigger member of a motion picture camera for affecting energization of the driving motor and the releasing apparatus of said camera after a predetermined interval and for limiting energization of said motor to another predetermined interval while said releasing member is in an off position, comprising first and second transistor means, each including a base, an emitter and a collector electrode and connected for alternate conduction, a delay circuit including a differential portion connected to the base electrode of said first transistor means for firing said first transistor means after a predetermined time period, said second transistor means being fired after said first transistor means is fully conductive, said timing network including a limiting portion for limiting energization of said motor to a predetermined scene interval, said limiting portion comprising differential network including a capacitor means and a variable resistor means connected to said capacitor means to vary the charging time thereof, said limiting portion being connected between the collector circuit of said first transistor means and the base electrode of said second transistor means.

* * * * *